United States Patent
Yoshida

(10) Patent No.: US 7,584,813 B2
(45) Date of Patent: Sep. 8, 2009

(54) DRIVING DEVICE AND MOTOR VEHICLE EQUIPPED WITH DRIVING DEVICE

(75) Inventor: Hiroshi Yoshida, Anjyou (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 538 days.

(21) Appl. No.: 11/266,372

(22) Filed: Nov. 4, 2005

(65) Prior Publication Data
US 2006/0097671 A1 May 11, 2006

(30) Foreign Application Priority Data
Nov. 8, 2004 (JP) .............................. 2004-323306

(51) Int. Cl.
*B60W 20/00* (2006.01)
(52) U.S. Cl. .............................. 180/65.29; 180/65.285; 320/148; 320/149; 318/812; 903/903
(58) Field of Classification Search ................ 180/65.2, 180/65.3, 65.4, 65.8; 318/109, 400.22, 812; 318/817; 701/22; 903/942, 943; 320/148, 320/149
See application file for complete search history.

(56) References Cited

U.S. PATENT DOCUMENTS

| | | | |
|---|---|---|---|
| 5,998,960 A | | 12/1999 | Yamada et al. |
| 6,158,405 A * | | 12/2000 | Masberg et al. .......... 123/192.1 |
| 6,211,681 B1 * | | 4/2001 | Kagawa et al. .............. 324/426 |
| 6,281,660 B1 * | | 8/2001 | Abe ............................ 320/103 |
| 6,476,571 B1 * | | 11/2002 | Sasaki ......................... 318/139 |
| 6,886,647 B1 * | | 5/2005 | Gotta ......................... 180/65.1 |
| 7,099,756 B2 * | | 8/2006 | Sato ............................. 701/22 |
| 7,183,740 B2 * | | 2/2007 | Nakayama et al. .......... 318/798 |
| 7,199,552 B2 * | | 4/2007 | Kobayashi .................. 320/106 |
| 7,212,891 B2 * | | 5/2007 | Sato ............................. 701/22 |
| 7,443,117 B2 * | | 10/2008 | Egami et al. ................ 318/139 |
| 2004/0112320 A1 | | 6/2004 | Bolz et al. |

(Continued)

FOREIGN PATENT DOCUMENTS

CN 1176904 A 3/1998

(Continued)

*Primary Examiner*—Jeffrey J Restifo
(74) *Attorney, Agent, or Firm*—Oliff & Berridge, PLC

(57) ABSTRACT

A driving device of the invention is mounted on a motor vehicle, where a sun gear, a carrier, and a ring gear of a planetary gear mechanism are respectively connected to a motor MG1, to an engine, and to a drive shaft and a motor MG2. The driving device has a power supply system including a capacitor, a transistor TR, and a diode DI. The capacitor is connected to power lines, which are shared by inverters for the motors MG1 and MG2 and are linked to a battery via a DC-DC converter. The transistor TR is located between the power lines and the capacitor and is arranged in a direction of charging the capacitor. The diode DI is arranged in an opposite direction in parallel with the transistor TR. Drive control of the transistor TR and the DC-DC converter converts an output voltage of the battery into a desired voltage level and outputs the converted voltage to the power lines, while adequately controlling charge and discharge of the capacitor. Adequate charge and discharge of the capacitor enables output of a preset power demand to the drive shaft and ensures the improved driving performance.

12 Claims, 14 Drawing Sheets

U.S. PATENT DOCUMENTS

| | | | |
|---|---|---|---|
| 2006/0052915 A1* | 3/2006 | Sato | 701/22 |
| 2006/0055349 A1* | 3/2006 | Nakayama et al. | 318/254 |
| 2006/0071860 A1* | 4/2006 | Hozoji et al. | 343/700 MS |
| 2006/0097671 A1* | 5/2006 | Yoshida | 318/109 |
| 2007/0161455 A1 | 7/2007 | King et al. | |
| 2007/0194763 A1* | 8/2007 | Egami et al. | 322/59 |
| 2007/0229009 A1* | 10/2007 | Egami et al. | 318/432 |

FOREIGN PATENT DOCUMENTS

| | | |
|---|---|---|
| CN | 1195617 A | 10/1998 |
| DE | 198 13 146 A1 | 10/1998 |
| DE | 102 13 105 A1 | 11/2002 |
| DE | 10 2005 024777 A1 | 12/2006 |
| JP | A-06-292305 | 10/1994 |
| JP | A 06-311608 | 11/1994 |
| JP | A-09-098514 | 4/1997 |
| JP | A 10-080007 | 3/1998 |
| JP | A-10-094107 | 4/1998 |
| JP | A-10-255800 | 9/1998 |
| JP | A-10-271611 | 10/1998 |
| JP | A 2002-154759 | 5/2002 |
| JP | A 2004-311090 | 11/2004 |
| WO | WO 02/066293 A1 | 8/2002 |

* cited by examiner

DRIVING DEVICE AND MOTOR VEHICLE EQUIPPED WITH DRIVING DEVICE

BACKGROUND OF THE INVENTION

1. Field of the Invention

The present invention relates to a driving device that drives a drive shaft, as well as to a motor vehicle that is equipped with such a driving device and runs via an axle linked to the drive shaft.

2. Description of the Prior Art

In a proposed driving device, a capacitor and a battery are connected via individual relays A and B in parallel with an inverter that drives a motor for outputting power to drive wheels (see, for example, Japanese Patent Laid-Open Gazette No. H09-98514). When an inter-terminal voltage of the capacitor is higher than an inter-terminal voltage of the battery, this proposed driving device switches only the relay A on to allow electric power supply from only the capacitor to the motor. When the inter-terminal voltage of the capacitor decreases to or below the inter-terminal voltage of the battery, the driving device switches the relay A off and the relay B on to allow electric power supply from only the battery to the motor. When the inter-terminal voltage of the capacitor is higher than the inter-terminal voltage of the battery and a high power output is required for the motor, the driving device switches both the relays A and B on to allow electric power supply from both the capacitor and the battery to the motor.

SUMMARY OF THE INVENTION

The driving device maybe equipped with a DC-DC converter that steps up the output voltage of the battery and supplies the step-up voltage to the inverter to follow the high power output of the motor. The DC-DC converter freely regulates the voltage applied to the input of the inverter. In application of a power supply system of a battery and a capacitor to this driving device, adequate connection of the battery with the capacitor and appropriate drive control of the DC-DC converter are essential to ensure sufficient exertion of the capacitor capability and thereby improve the driving performance.

In a driving device including a capacitor in combination with a secondary battery connected to a driving circuit of a motor via a voltage converter and in a motor vehicle equipped with such a driving device, the object of the invention is to ensure output of a preset power demand to a drive shaft. In the driving device including the capacitor in combination with the secondary battery connected to the driving circuit of the motor via the voltage converter and in the motor vehicle equipped with the driving device, the object of the invention is also to adequately charge the capacitor with electric power regenerated by the motor. In the driving device including the capacitor in combination with the secondary battery connected to the driving circuit of the motor via the voltage converter and in the motor vehicle equipped with the driving device, the object of the invention is to improve the driving performance without using an excessively high-performance capacitor.

At least part of the above and the other related objects is attained by an internal combustion engine system, a driving device and a motor vehicle equipped with the driving device of the invention having the configurations discussed below.

The present invention is directed to a driving device that drives a drive shaft. The driving device includes: a motor that has power generation capability and inputs and outputs power from and to the drive shaft; a driving circuit that drives the motor; a power supply system including a secondary battery that is linked to the driving circuit via a voltage converter, a capacitor that transmits electric power to and from an electric power line connecting the voltage converter with the driving circuit, and a connection switch that is located between the electric power line and the capacitor; and a drive control module that drives and controls the driving circuit, the voltage converter, and the connection switch to output a power equivalent to a preset power demand to the drive shaft.

The power supply system mounted on the driving device of the invention includes the secondary battery that is linked via the voltage converter to the driving circuit for driving the motor, the capacitor that transmits electric power to and from the electric power line connecting the voltage converter with the driving circuit, and the connection switch that is located between the electric power line and the capacitor. The driving circuit, the voltage converter, and the connection switch are driven and controlled to output the power equivalent to a preset power demand to the drive shaft. In the driving device including the capacitor in combination with the secondary battery connected to the driving circuit via the voltage converter, drive control of the voltage converter and the connection switch ensure output of the preset power demand to the drive shaft.

In one preferable embodiment of the invention, the driving device further includes a voltage sensor that measures an inter-terminal voltage of the capacitor. In response to a request of motor regenerative control in an off state of the connection switch, the drive control module drives and controls the driving circuit to trigger regenerative control of the motor, while driving and controlling the voltage converter to make a voltage level applied to the electric power line approach to the measured inter-terminal voltage of the capacitor. The drive control module subsequently drives and controls the connection switch and the voltage converter to turn on the connection switch and to charge the capacitor with electric power regenerated by the motor. This arrangement effectively prevents generation of inrush current in the process of charging the capacitor with electric power regenerated by the motor. In the driving device of this embodiment, the drive control module may drive and control the voltage converter to make the voltage level applied to the electric power line substantially equal to the measured inter-terminal voltage of the capacitor.

In another preferable embodiment of the invention, the connection switch may include a semiconductor switch arranged in a direction of charging the capacitor and a diode arranged in an opposite direction in parallel to the semiconductor switch.

In one preferable structure of the driving device with the connection switch including the semiconductor switch and the diode, the drive control module drives and controls the semiconductor switch and the voltage converter to allow electric power supply from at least one of the secondary battery and the capacitor to the driving circuit, in order to satisfy the power demand. This arrangement enables electric power supply from the capacitor to the driving circuit to satisfy the preset power demand. In one preferable application of the driving device of this structure, when output of a power equivalent to the power demand to the drive shaft is attainable in a range of output restriction of the secondary battery, the drive control module drives and controls the semiconductor switch and the voltage converter to allow electric power supply from the secondary battery to the driving circuit but to prohibit electric power supply from the capacitor to the driving circuit. When the output of the power equivalent to the power demand to the drive shaft is not attainable in the range of output restriction of the secondary battery, the drive control module drives and controls the semiconductor switch and the voltage converter to allow electric power supply from both the secondary battery and the capacitor to the driving circuit. Such drive control enables output of even a relatively large power demand, while preventing unnecessary use of the capacitor. This arrangement desirably improves the driving performance without an excessively high-performance capacitor.

In another preferable structure of the driving device with the connection switch including the semiconductor switch and the diode, when an inter-terminal voltage of the capacitor is lower than a preset reference level, the drive control module drives and controls the semiconductor switch and the voltage converter to electrically block the capacitor from the electric power line. Such drive control converts the output voltage of the secondary battery into a desired voltage level by the voltage converter and supplies the converted voltage to the driving circuit, while electrically blocking the capacitor from the electric power line. The blockage effectively prevents the voltage supply to the driving circuit from decreasing below a threshold level of significantly reducing the output power of the motor with a voltage drop of the capacitor.

In another preferable embodiment of the invention, the driving device further includes: an internal combustion engine; and a power generation unit that utilizes output power of the internal combustion engine to generate electric power and supplies the generated electric power to the driving circuit. In one preferable structure of this embodiment, the connection switch includes a semiconductor switch arranged in a direction of charging the capacitor and a diode arranged in an opposite direction in parallel to the semiconductor switch. When the power demand increases to or over a predetermined power level, the drive control module controls operations of the internal combustion engine and the power generation unit to output power, drives and controls the semiconductor switch and the voltage converter to allow electric power supply from at least one of the secondary battery and the capacitor to the driving circuit, based on a difference between an actual output power of the internal combustion engine and the power demand, and drives and controls the driving circuit to output a power equivalent to the power demand to the drive shaft. This arrangement enables electric power supply from the capacitor to the driving circuit to satisfy the preset power demand. In the driving device of this structure, when output of a power equivalent to the power demand to the drive shaft is attainable by a total of the actual output power of the internal combustion engine and a maximum output restriction of the secondary battery, the drive control module may drive and control the semiconductor switch and the voltage converter to allow electric power supply from the secondary battery to the driving circuit but to prohibit electric power supply from the capacitor to the driving circuit. When the output of the power equivalent to the power demand to the drive shaft is not attainable by the total of the actual output power of the internal combustion engine and the maximum output restriction of the secondary battery, the drive control module may drive and control the semiconductor switch and the voltage converter to allow electric power supply from both the secondary battery and the capacitor to the driving circuit. Even when the response delay of the internal combustion engine does not allow the output level of the internal combustion engine to immediately follow a sudden increase of the power demand, such drive control enables the desired power demand to be output to the drive shaft, while preventing unnecessary use of the capacitor. This arrangement desirably improves the driving performance without an excessively high-performance capacitor. The power generation unit may include: a three shaft-type power input output module that is linked to three shafts, that is, an output shaft of the internal combustion engine, the drive shaft, and a third rotating shaft, and inputs and outputs power from and to a residual one shaft, based on powers input from and output to any two shafts among the three shafts; and a generator that is capable of inputting and outputting power from and to the third rotating shaft. Alternatively the power generation unit may include a pair-rotor motor that has a first rotor connected to an output shaft of the internal combustion engine and a second rotor connected to the drive shaft and rotates the first rotor relative to the second rotor through electromagnetic interactions of the first rotor and the second rotor.

The present invention is also directed to a motor vehicle. The motor vehicle includes: a motor that has power generation capability and inputs and outputs power from and to a drive shaft linked to an axle of said motor vehicle; a driving circuit that drives the motor; a power supply system including a secondary battery that is linked to the driving circuit via a voltage converter, a capacitor that transmits electric power to and from an electric power line connecting the voltage converter with the driving circuit, and a connection switch that is located between the electric power line and the capacitor; and a drive control module that drives and controls the driving circuit, the voltage converter, and the connection switch to output a power equivalent to a preset power demand to the drive shaft.

The power supply system mounted on the motor vehicle of the invention includes the secondary battery that is linked via the voltage converter to the driving circuit for driving the motor, the capacitor that transmits electric power to and from the electric power line connecting the voltage converter with the driving circuit, and the connection switch that is located between the electric power line and the capacitor. The driving circuit, the voltage converter, and the connection switch are driven and controlled to output the power equivalent to a preset power demand to the drive shaft. In the system including the capacitor in combination with the secondary battery connected to the driving circuit via the voltage converter, drive control of the voltage converter and the connection switch ensure output of the preset power demand to the drive shaft.

DESCRIPTION OF THE PREFERRED EMBODIMENTS

Figure 1:
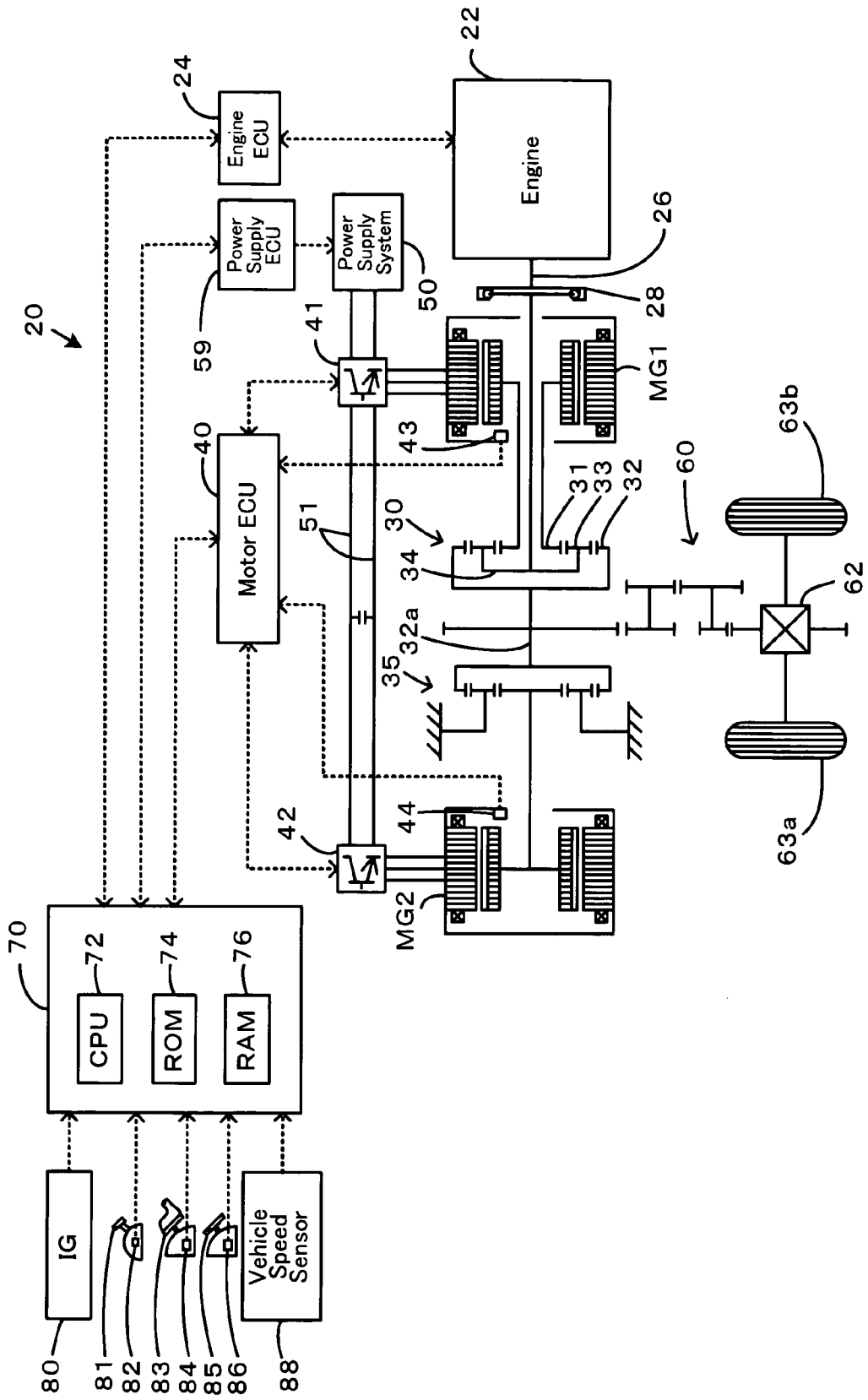
FIG. 1 schematically illustrates the configuration of a hybrid vehicle equipped with a driving device in one embodiment of the invention.

One mode of carrying out the invention is described below as a preferred embodiment. FIG. 1 schematically illustrates the configuration of a hybrid vehicle 20 equipped with a driving device in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a reduction gear 35 that is attached to a ring gear shaft 32a or a drive shaft linked to the power distribution integration mechanism 30, a motor MG2 that is connected to the reduction gear 35, a power supply system 50 that receives and transmits electric power from and to the motors MG1 and MG2, and a hybrid electronic control unit 70 that controls the whole driving system of the hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

Figure 2:
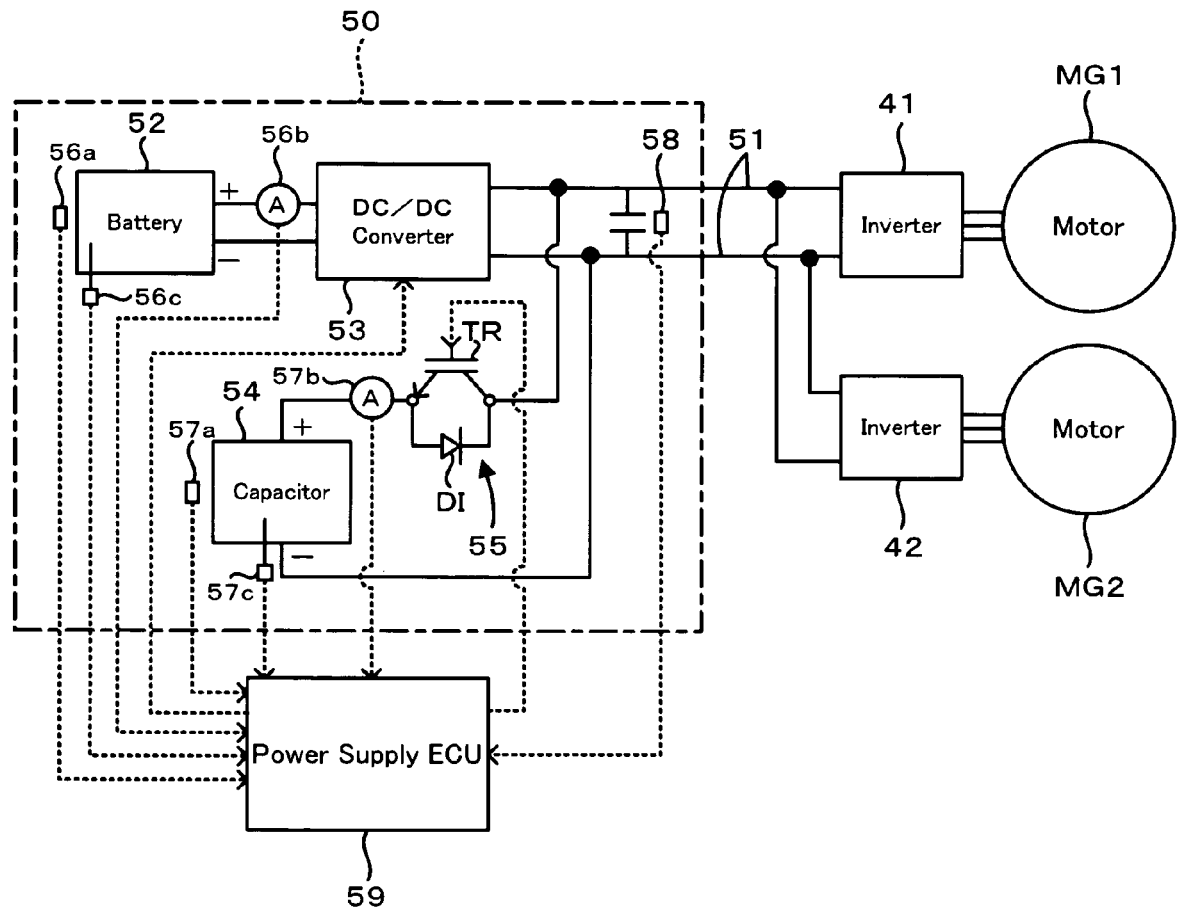
FIG. 2 schematically illustrates the structure of a power supply system included in the driving device of FIG. 1.

FIG. 2 schematically illustrates the structure of the power supply system 50. As illustrated, the power supply system 50 includes a battery 52 that is connected via a DC-DC converter 53 to the power lines 51 structured as the common positive bus and negative bus shared by the inverters 41 and 42, a capacitor 54 (for example, an electric double layer capacitor) that transmits electric power to and from the power lines 51, and a connection switch 55. The connection switch 55 includes a transistor TR (for example, an IGBT) that is located between the power lines 51 and the capacitor 54 and is arranged in a direction of charging the capacitor 54, and a diode DI that is connected in an opposite direction in parallel with the transistor TR. The drive control of the DC-DC converter 53 and the transistor TR converts the output voltage of the battery 52 into a desired voltage level to be output to the power lines 51, while regulating the charge and discharge of the capacitor 54. The power supply system 50 is under control of a power supply electronic control unit (hereafter referred to as power supply ECU) 59. The power supply ECU 59 receives signals required for control of the power supply system 50, for example, a battery voltage Vbat from a voltage sensor 56a located between terminals of the battery 52, a battery current Ibat from a current sensor 56b connected to an output terminal of the battery 52, and a battery temperature Tbat from a temperature sensor 56c attached to the battery 52. The power supply ECU 59 also receives a capacitor voltage Vcap from a voltage sensor 57a located between terminals of the capacitor 54, a capacitor current Icap from a current sensor 57b connected to an output terminal of the capacitor 54, a capacitor temperature Tcap from a temperature sensor 57c attached to the capacitor 54, and a system voltage Vsys from a voltage sensor 58 located between terminals of a smoothing capacitor connected to the power lines 51. The power supply ECU 59 outputs switching control signals to the DC-DC converter 53 and drive signals to the transistor TR. The power supply ECU 59 communicates with the hybrid electronic control unit 70 via respective communication ports. The power supply ECU 59 drives and controls the DC-DC converter 53 and the transistor TR in response to control signals received from the hybrid electronic control unit 70, while outputting data regarding the current conditions of the power supply system 50 to the hybrid electronic control unit 70 according to the requirements.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
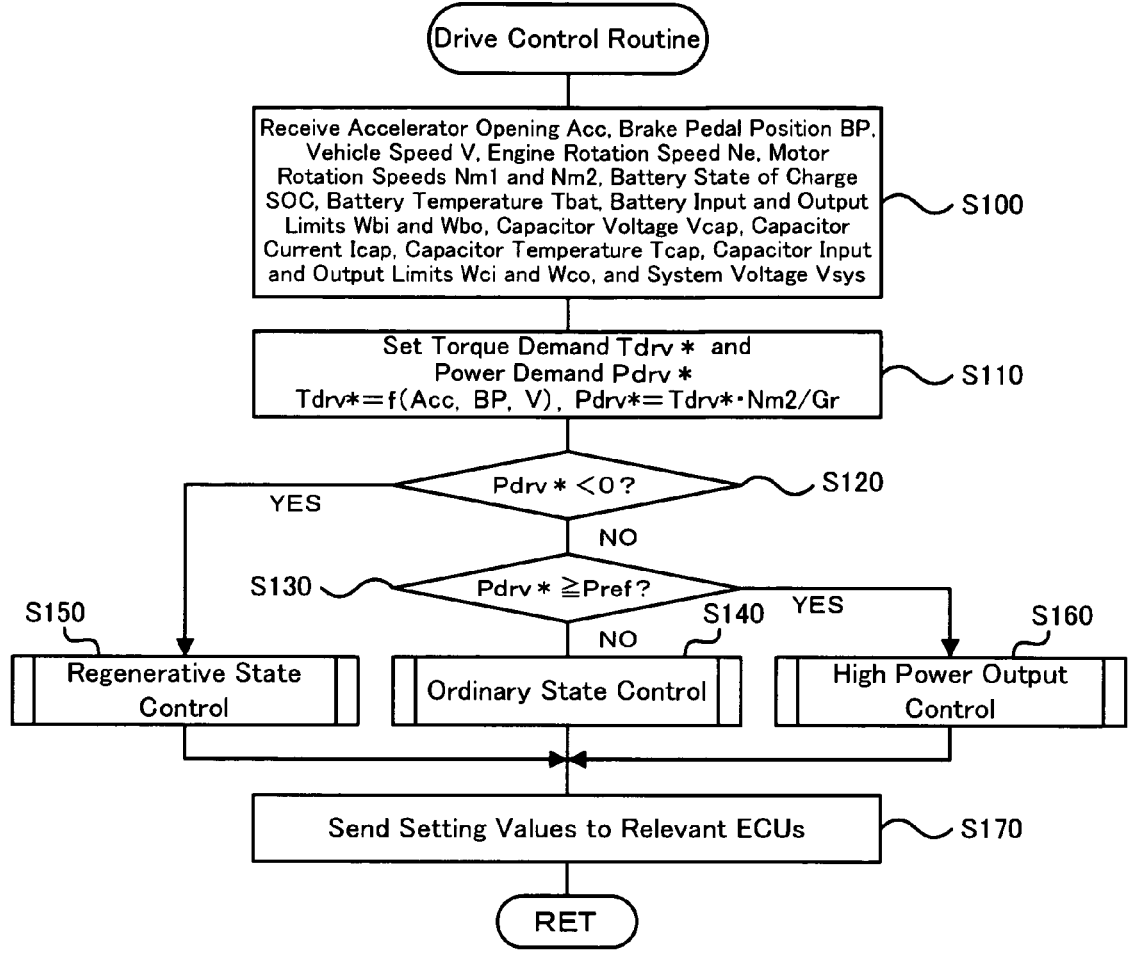
FIG. 3 is a flowchart showing a drive control routine executed by a hybrid electronic control unit mounted on the hybrid vehicle of the embodiment.

The description regards the operations of the hybrid vehicle 20 of the embodiment constructed as discussed above. FIG. 3 is a flowchart showing a drive control routine executed by the hybrid electronic control unit 70 mounted on the hybrid vehicle 20 of the embodiment. This drive control routine is carried out repeatedly at preset time intervals, for example, at every 8 msec.

In the drive control routine, the CPU 72 of the hybrid electronic control unit 70 first receives various data required for control, for example, the accelerator opening Acc from the accelerator pedal position sensor 84, the brake pedal position BP from the brake pedal position sensor 86, the vehicle speed V from the vehicle speed sensor 88, a rotation speed Ne of the engine 22, rotation speeds Nm1 and Nm2 of the motors MG1 and MG2, a remaining charge or state of charge SbC of the battery 52, the battery temperature Tbat, battery input and output limits Wbi and Wbo, the capacitor voltage Vcap, the capacitor current Icap, the capacitor temperature Tcap, capacitor input and output limits Wci and Wco, and the system voltage Vsys (step S100). The rotation speed Ne of the engine 22 is measured by a rotation speed sensor (not shown) and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The state of charge SOC of the battery 52 is computed from integrated values of the battery current Ibat measured by the current sensor 56b and is received from the power supply ECU 59 by communication. The battery temperature Tbat is measured by the temperature sensor 56c and is received from the power supply ECU 59 by communication. The battery input and output limits Wbi and Wbo are set corresponding to the measured battery temperature Tbat and the computed state of charge SOC and is received from the power supply ECU 59 by communication. The capacitor voltage Vcap, the capacitor current Icap, the capacitor temperature Tcap, and the system voltage Vsys are respectively measured by the voltage sensor 57a, the current sensor 57b, the temperature sensor 57c, and the voltage sensor 58 and are received from the power supply ECU 59 by communication. The capacitor input and output limits Wci and Wco are set corresponding to the measured capacitor current Icap, the measured capacitor voltage Vcap, and the measured capacitor temperature Tcap and are received from the power supply ECU 59 by communication.

Figure 4:
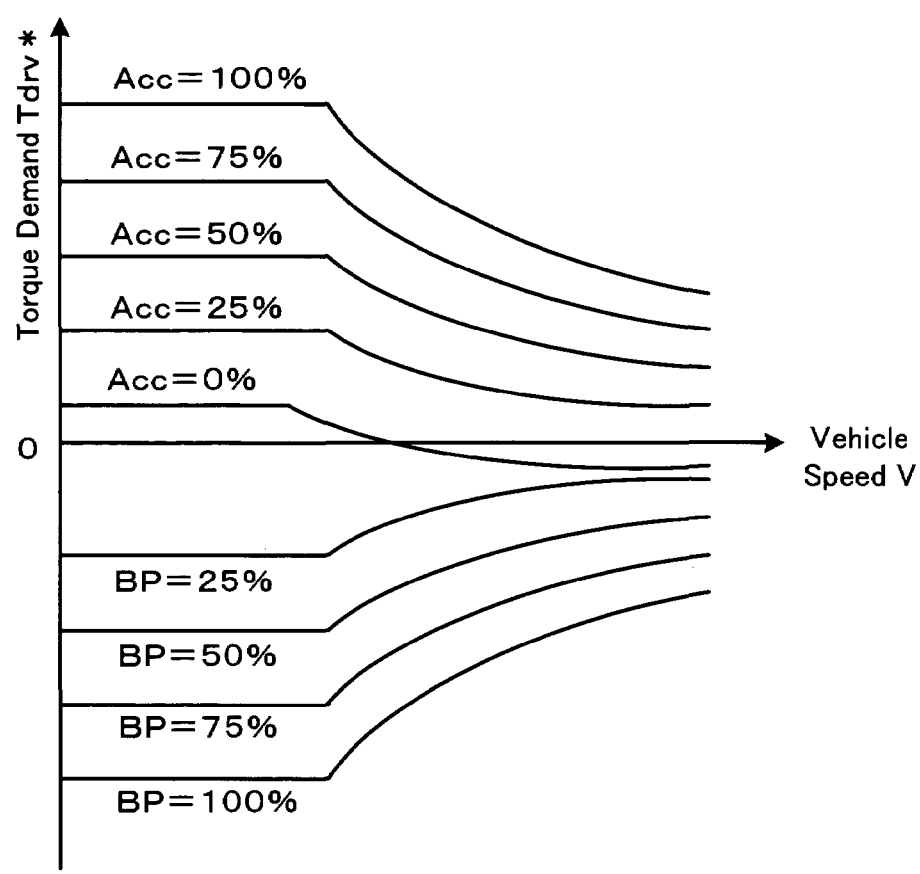
FIG. 4 shows one example of a torque demand setting map.

After the data input, the CPU 72 sets a torque demand Tdrv* and a power demand Pdrv* to be output to the ring gear shaft 32a or the drive shaft, based on the input accelerator opening Acc, the input brake pedal position BP, and the input vehicle speed V (step S110). The concrete procedure of setting the torque demand Tdrv* in this embodiment stores in advance variations in torque demand Tdrv* against the accelerator opening Acc, the brake pedal position BP, and the vehicle speed V as a torque demand setting map in the ROM 74 and reads the torque demand Tdrv* corresponding to the given accelerator opening Acc, the given bake pedal position BP, and the given vehicle speed V from the torque demand setting map. One example of the torque demand setting map is shown in FIG. 4. The power demand Pdrv* is computed as the product of the torque demand Tdrv* and a rotation speed Nr of the ring gear shaft 32a. The rotation speed Nr of the ring gear shaft 32a is obtained by dividing the rotation speed Nm2 of the motor MG2 by a gear ratio Gr of the reduction gear 35 or by multiplying the vehicle speed V by a predetermined conversion coefficient.

Figure 5:
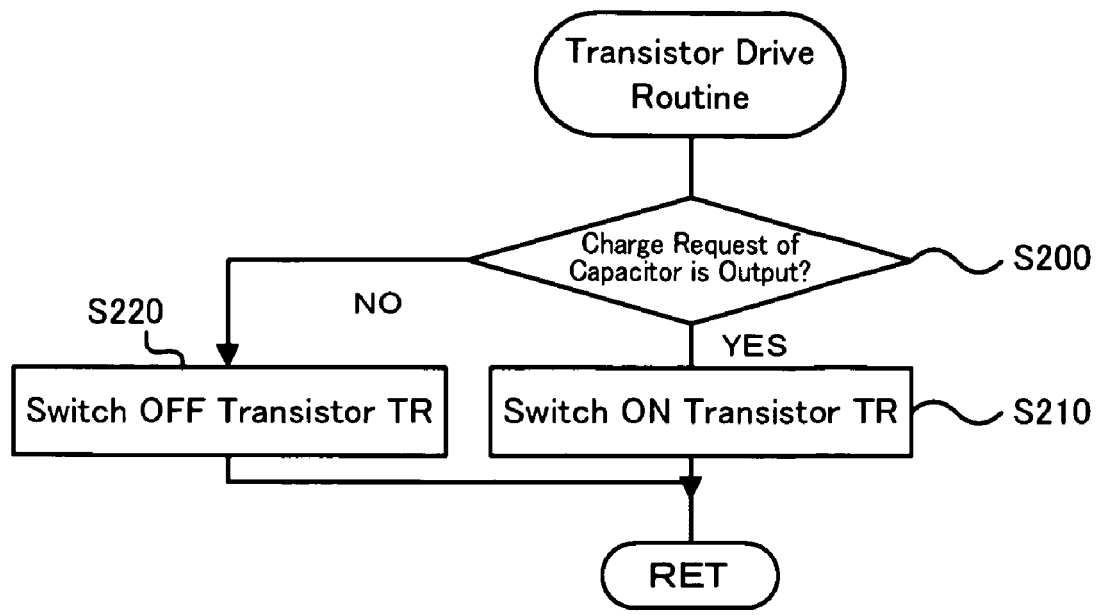
FIG. 5 is a flowchart showing a transistor drive routine.

The CPU 72 sequentially determines whether the computed power demand Pdrv* is less than 0 (step S120) and determines whether the computed power demand Pdrv* is not less than a preset reference power level Pref (step S130). The preset reference power level Pref depends upon the performance of the engine 22 and is used as a criterion to determine whether the output power of the engine 22 is sufficient or insufficient for output of the torque demand Tdrv* to the ring gear shaft 32a, that is, whether assist of the power supply system 50 is required. When the computed power demand Pdrv* is not less than 0 but is less than the preset reference power level Pref, that is, in response to combined negative answers at both steps S120 and S130, the drive control routine goes to step S140 to perform ordinary state control shown in the flowchart of FIG. 6. When the computed power demand Pdrv* is less than 0, that is, in response to an affirmative answer at step S120, the drive control routine goes to step S150 to perform regenerative state control shown in the flowchart of FIG. 9. When the computed power demand Pdrv* is not less than the preset reference power level Pref, that is, in response to an affirmative answer at step S130, the drive control routine goes to step S160 to perform high power output control shown in the flowchart of FIG. 11. The details of the ordinary state control, the regenerative state control, and the high power output control are described in this sequence, with suspension of the description of the drive control routine of FIG. 3. As the premise for these control processes, the transistor TR included in the power supply system 50 is operated on and off in the following manner. FIG. 5 is a flowchart showing a transistor drive routine, which is executed repeatedly at preset time intervals, for example, at every 8 msec. In the transistor drive routine, the CPU 72 of the hybrid electronic control unit 70 determines whether a charge request of the capacitor S4 is output (step S200). In response to output of the charge request, the transistor TR is switched ON (step S210). In the case of no output of the charge request, on the other hand, the transistor TR is switched OFF (step S220) Namely the transistor TR is controlled ON only under the requirement for charging the capacitor TR and is otherwise controlled OFF. The output of the charge request of the capacitor 54 is described below.

Figure 6:
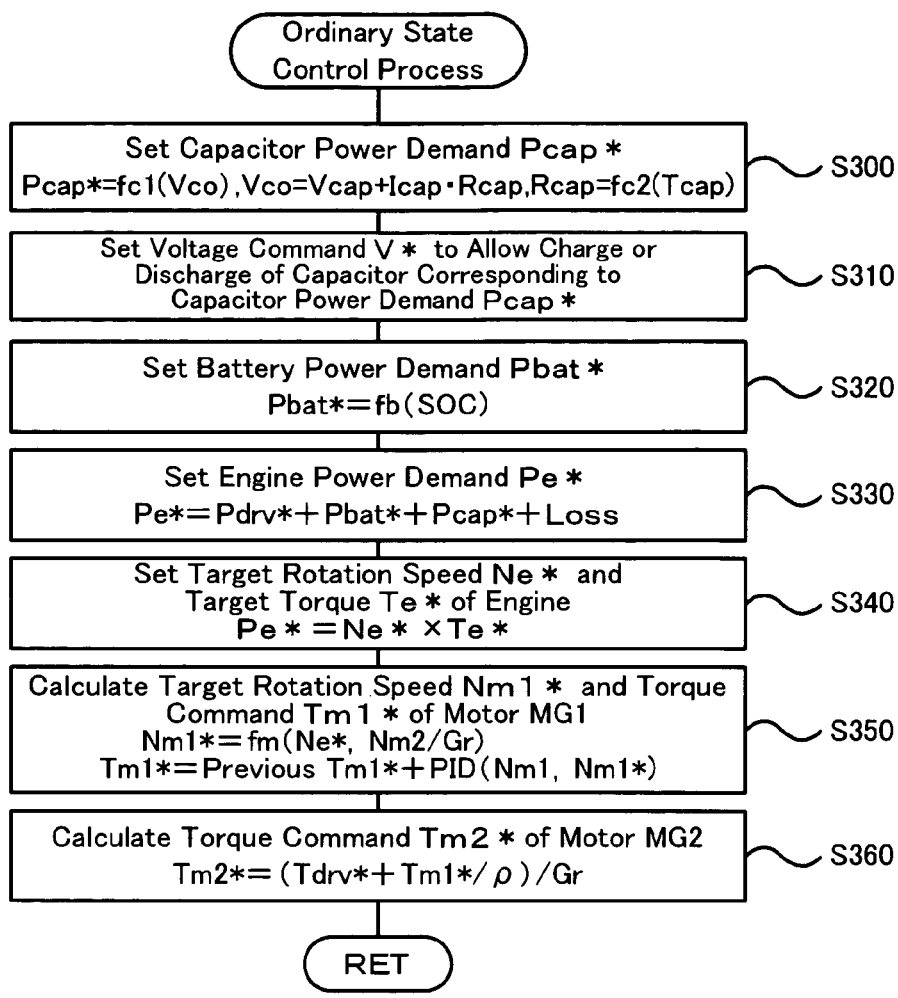
FIG. 6 is a flowchart showing an ordinary state control process executed at step S140 in the drive control routine of FIG. 3.

In the ordinary state control process of FIG. 6, the CPU 72 of the hybrid electronic control unit 70 sets a capacitor power demand Pcap*, based on the input capacitor voltage Vcap, the input capacitor current Icap, and the input capacitor temperature Tcap (step S300). The concrete procedure of this embodiment refers to a preset map representing a variation in inner resistance Rcap of the capacitor 54 against the capacitor temperature Tcap and reads the inner resistance Rcap corresponding to the input capacitor temperature Tcap from the preset map. The procedure then computes an open-circuit voltage Voc of the capacitor 54 (capacitor open-circuit voltage) from the read inner resistance Rcap, the input capacitor voltage Vcap, and the input capacitor current Icap according to Equation (1) given below:

$$Voc = Vcap + Icap \cdot Rcap \tag{1}$$

The procedure subsequently refers to a preset map representing a variation in capacitor power demand Pcap* against the capacitor open-circuit voltage Voc and reads the capacitor power demand Pcap* corresponding to the computed capacitor open-circuit voltage Voc from the preset map. The map is designed to give a greater discharge power as the capacitor power demand Pcap* with an increase of the capacitor open-circuit voltage Voc over a preset reference level and to give a greater charging power as the capacitor power demand Pcap* with a decrease of the capacitor open-circuit voltage Voc below the preset reference level. In response to setting a charging power as the capacitor power demand Pcap*, the charge request of the capacitor 54 is output to switch ON the transistor TR in the transistor drive routine of FIG. 5. A voltage command V* is set to allow charge or discharge the capacitor 54 corresponding to the capacitor power demand Pcap* (step S310).

A battery power demand Pbat* to charge or discharge the battery 52 is subsequently set corresponding to the input state of charge SOC of the battery 52 (step S320). The concrete procedure of this embodiment refers to a preset map representing a variation in battery power demand Pbat* against the state of charge SOC and reads the battery power demand Pbat* corresponding to the input state of charge SOC from the preset map. The map is designed to give a greater discharge power as the battery power demand Pbat* with an increase of the state of charge SOC over a preset reference level and to give a greater charging power as the battery power demand Pbat* with a decrease of the state of charge SOC below the preset reference level.

Figure 7:
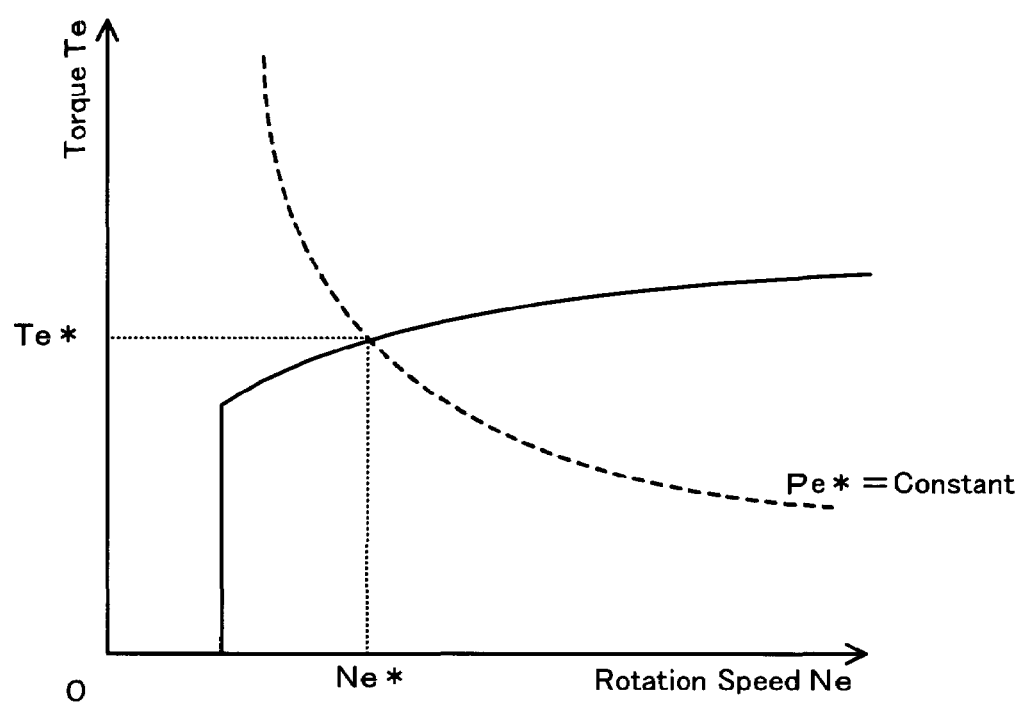
FIG. 7 shows an efficient operation line of an engine to set a target rotation speed Ne* and a target torque Te*.

After setting the battery power demand Pbat*, the CPU 72 calculates an engine power demand Pe* to be output from the engine 22 as the sum of the power demand Pdrv* set at step S110 in the drive control routine of FIG. 3, the capacitor power demand Pcap*, the battery power demand Pbat*, and a potential loss (step S330). A target rotation speed Ne* and a target torque Te* are then set as an efficient drive point of the engine 22, based on the engine power demand Pe* (step S340). The target rotation speed Ne* and the target torque Te* of the engine 22 are determined according to an efficient operation line of ensuring efficient operations of the engine 22 and the engine power demand P*. FIG. 7 shows an efficient operation line of the engine 22 to set the target rotation speed Ne* and the target torque Te*. The target rotation speed Ne* and the target torque Te* are given at an intersection of the efficient operation line and a line of constant engine power demand Pe* (=Ne*×Te*)

The CPU 72 subsequently calculates a target rotation speed Nm1* of the motor MG1 from the target rotation speed Ne* of the engine 22, the rotation speed Nr (=Nm2/Gr) of the ring gear shaft 32a, and a gear ratio ρ (=number of teeth of the sun gear 31/number of teeth of the ring gear 32) of the power distribution integration mechanism 30 according to Equation (2) given below, while calculating a torque command Tm1* of the motor MG1 from the calculated target rotation speed Nm1* and the input current rotation speed Nm1 of the motor MG1 according to Equation (3) given below (step S350):

$$Nm1^* = (Ne^*(1+\rho) - k \cdot V)/\rho \tag{2}$$

$$Tm1^* = \text{Previous } Tm1^* + KP(Nm1^* - Nm1) + KI \int (Nm1^* - Nm1) dt \tag{3}$$

Figure 8:
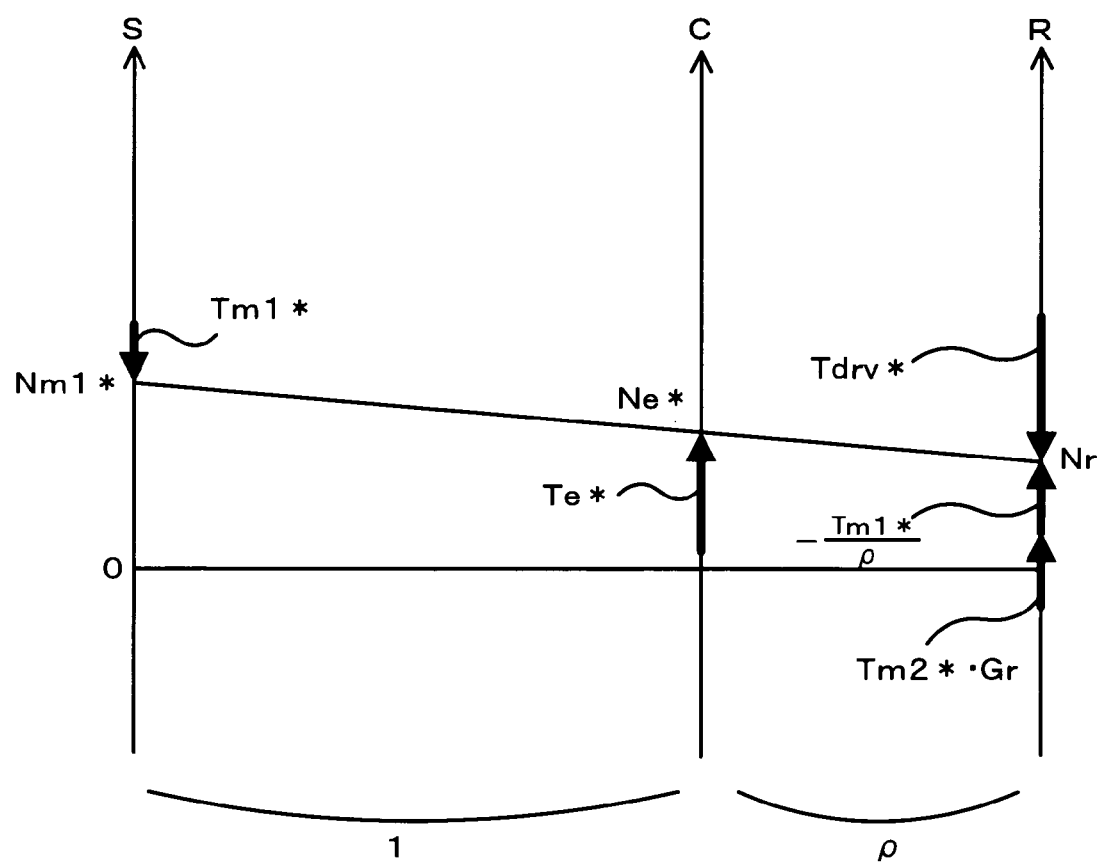
FIG. 8 is an alignment chart showing torque-rotation speed dynamics of respective rotational elements of a power distribution integration mechanism included in the hybrid vehicle of FIG. 1.

FIG. 8 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (the ring gear shaft 32a). The target rotation speed Nm1* of the motor MG1 is accordingly calculated from the rotation speed Nr of the ring gear shaft 32a, the target rotation speed Ne* of the engine 22, and the gear ratio ρ of the power distribution integration mechanism 30 according to Equation (2) given above. The torque command Tm1* of the motor MG1 is set to ensure rotation of the motor MG1 at the target rotation speed Nm1*. Such drive control of the motor MG1 enables the engine 22 to be rotated at the target rotation speed Ne*. Equation (3) is a relational expression of feedback control to drive and rotate the motor MG1 at the target rotation speed Nm1*. In Equation (3) given above, 'KP' in the second term and 'KI' in the third term on the right side respectively denote a gain of the proportional and a gain of the integral term. Two thick arrows on the axis 'R' in the alignment chart of FIG. 8 respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a when a torque Tm2* is output from the motor MG2.

After calculation of the target rotation speed Nm1* and the torque command Tm1* of the motor MG1, the CPU 72 calculates a torque command Tm2* as a torque to be output from the motor MG2 from the torque demand Tdrv*, the torque command Tm1* of the motor MG1, the gear ratio ρ of the power distribution integration mechanism 30, and the gear ratio Gr of the reduction gear 35 according to Equation (4) given below (step S360):

$$Tm2^* = (Tdrv^* + Tm1^*/\rho)/Gr \qquad (4)$$

Equation (4) is led from the torque relation on the axis 'R' in the alignment chart of FIG. 8. The torque command Tm2* of the motor MG2 is required to output a torque equivalent to the torque demand Tdrv* to the ring gear shaft 32a.

After setting the voltage command V*, the target rotation speed Ne* and the target torque Te* of the engine 22, the torque commands Tm1* and Tm2* of the motors MG1 and MG2, the CPU 72 terminates this ordinary state control process of FIG. 6 and concludes the processing of step S140 in the drive control routine of FIG. 3. The CPU 72 sends the voltage command V* to the power supply ECU 59, the target rotation speed Ne* and the target torque Te* of the engine 22 to the engine ECU 24, and the torque commands Tm1* and Tm2* of the motors MG1 and MG2 to the motor ECU 40 (step S170) and terminates the drive control routine. The power supply ECU 59 receives the voltage command V* and executes switching control of the switching elements included in the DC-DC converter 53 to ensure application of a voltage equivalent to the received voltage command V* to the power lines 51. The engine ECU 24 receives the target rotation speed Ne* and the target torque Te* of the engine 22 and executes fuel injection control and ignition control of the engine 22 to drive the engine 22 at the specified drive point of the target rotation speed Ne* and the target torque Te*. The motor ECU 40 receives the torque commands Tm1* and Tm2* of the motors MG1 and MG21 and executes switching control of the switching elements included in the respective inverters 41 and 42 to drive the motor MG1 with the torque command Tm1* and the motor MG2 with the torque command Tm2*.

Figure 9:
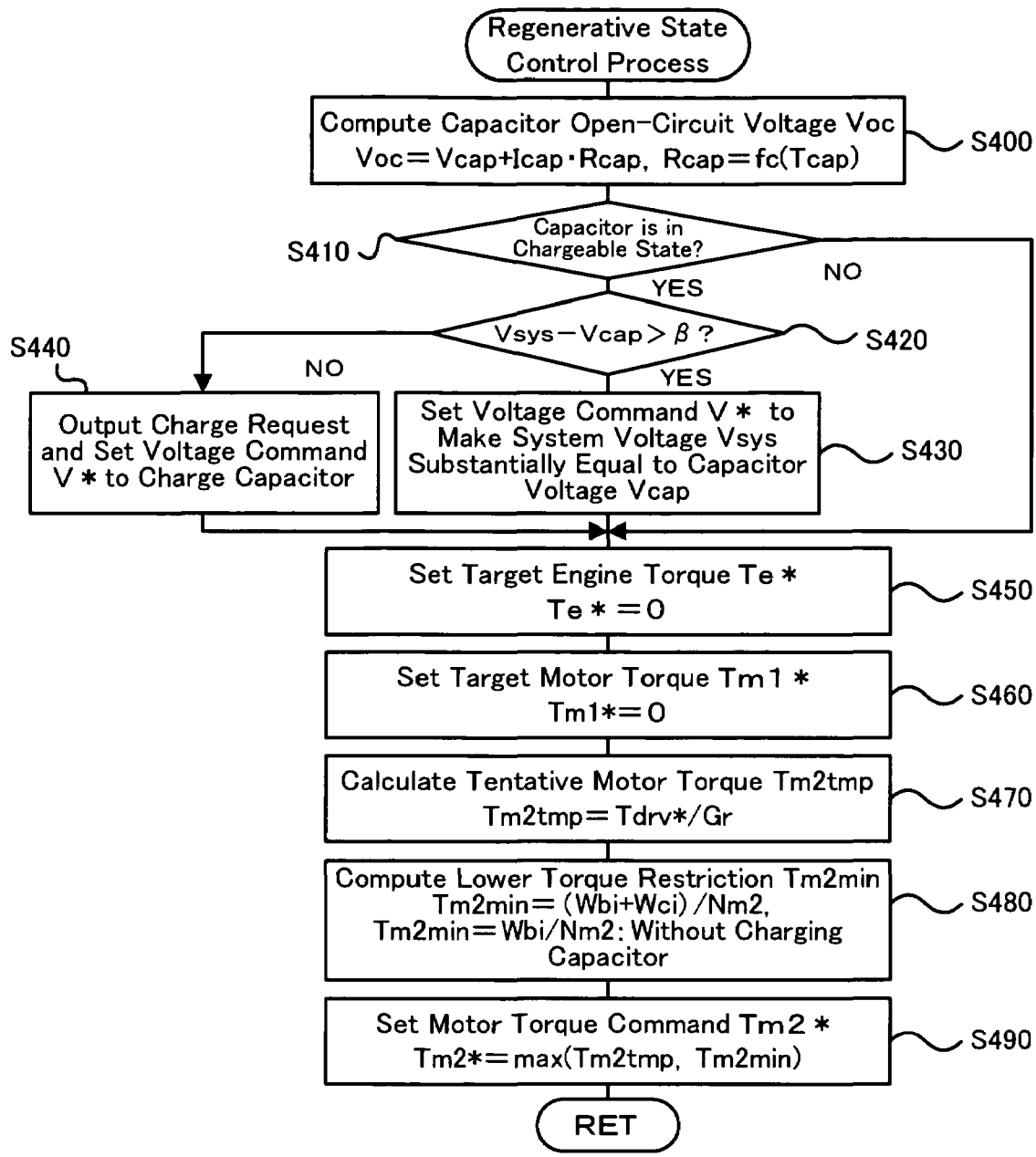
FIG. 9 is a flowchart showing a regenerative state control process executed at step S150 in the drive control routine of FIG. 3.

In the regenerative state control process of FIG. 9, the CPU 72 of the hybrid electronic control unit 70 first computes the capacitor open-circuit voltage Voc from the input capacitor voltage Vcap, the input capacitor current Icap, and the input capacitor temperature Tcap according to Equation (1) given above (step S400) and determines whether the capacitor 54 is in a chargeable state according to the computed capacitor open-circuit voltage Voc (step S410). The determination is based on a result of comparison between the computed capacitor open-circuit voltage Voc and a reference charging level, which is lower than an upper limit of a working voltage range of the capacitor 54. When the computed capacitor open-circuit voltage Voc reaches or exceeds the reference charging level, the CPU 72 determines at step S410 that the capacitor 54 is not in the chargeable state, skips the process of outputting the charge request of the capacitor 54, and immediately sets the target torque Te* of the engine 22 to 0 (step S450). The CPU 72 subsequently sets the torque command Tm1* of the motor MG1 to 0 (step S460), and calculates a tentative motor torque Tm2tmp to be output from the motor MG2 (step S470). The tentative motor torque Tm2tmp is calculated by dividing the torque demand Tdrv* set at step S110 in the drive control routine of FIG. 3 by the gear ratio Gr of the reduction gear 35 according to Equation (5) given below:

$$Tm2tmp = Tdrv^*/Gr \qquad (5)$$

The CPU 72 divides the battery input limit Wbi by the current rotation speed Nm2 of the motor MG2 according to Equation (6) given below and sets the quotient to a lower torque restriction Tm2min as a minimum possible torque output from the motor MG2 (step S480):

$$Tm2min = Wbi/Nm2 \qquad (6)$$

The greater between the tentative motor torque Tm2tmp and the lower torque restriction Tm2min is set to the torque command Tm2* of the motor MG2 (step S490). The CPU 72 terminates this regenerative state control process of FIG. 9 and concludes the processing of step S150 in the drive control routine of FIG. 3. The CPU 72 then sends the respective setting values to the relevant ECUs (step S170) and terminates the drive control routine of FIG. 3. In this state without output of the charge request of the capacitor 54, the transistor TR is kept OFF and the electric power regenerated by the motor MG2 is all charged into the battery 52. The regenerative electric power of the motor MG2 is restricted in the range of the battery input limit Wbi.

When the computed capacitor open-circuit voltage Voc is below the reference charging level, the CPU 72 determines at step S410 that the capacitor 54 is in the chargeable state and subsequently compares a voltage difference (Vsys−Vcap) between the system voltage Vsys and the capacitor voltage Vcap with a preset threshold value β (step S420). The threshold value β is set to prevent generation of inrush current by an ON operation of the transistor TR under the condition of a large voltage difference between the system voltage Vsys and the capacitor voltage Vcap. When the voltage difference is greater than the preset threshold value β, the voltage command V* is set to make the system voltage Vsys substantially equal to the capacitor voltage Vcap (step S430). The regenerative state control process then executes the processing of and after step S450 described above. When the voltage difference between the system voltage Vsys and the capacitor voltage Vcap decreases to or below the preset threshold value β at step S420, the CPU 72 outputs the charge request of the capacitor 54 and sets the voltage command V* to charge the capacitor 54 (step S440). The regenerative state control process then executes the processing of and after step S450 described above. In response to the output charge request of the capacitor 54, the transistor TR is switched ON in the transistor drive routine of FIG. 5. The capacitor 54 accordingly starts charging with the electric power regenerated by the motor MG2. Distribution of the regenerative electric power of the motor MG2 into the charging power of the battery 52 and the charging power of the capacitor 54 is determined by regulating the voltage command V*. In the state of charging the capacitor 54, the lower torque restriction Tm2min is set according to Equation (7) given below, in place of Equation (6) at step S480:

$$Tm2\min=(Wbi+Wci)/Nm2 \qquad (7)$$

The lower torque restriction Tm2min is computed by dividing the sum of the battery input limit Wbi and the capacitor input limit Wci by the rotation speed Nm2 of the motor MG2. In the state of charging the capacitor 54, the regenerative electric power of the motor MG2 is restricted in the range of the battery input limit Wbi and the capacitor input limit Wci.

Figure 10:
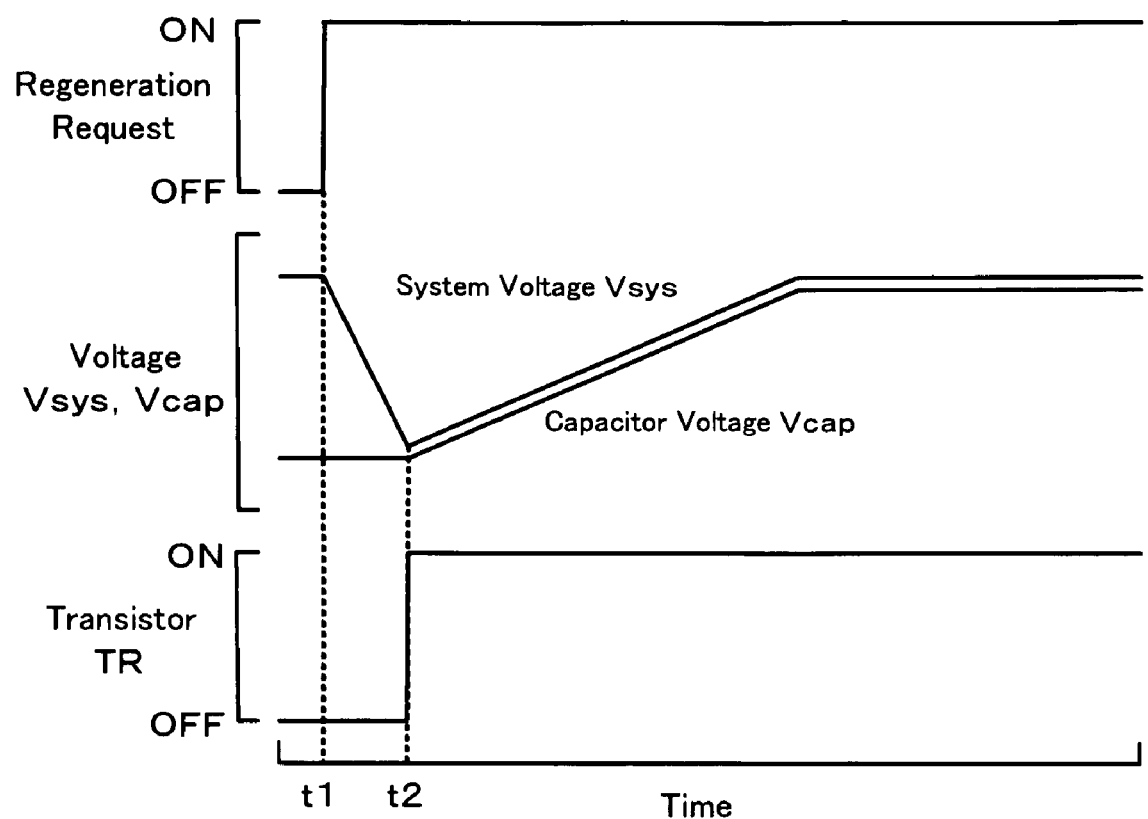
FIG. 10 shows time variations of a system voltage Vsys and a capacitor voltage Vcap and the ON-OFF state of a transistor TR in response to output of a regeneration request.

FIG. 10 shows time variations of the system voltage Vsys and the capacitor voltage Vcap and the ON-OFF state of the transistor TR in response to output of a regeneration request. At a time point t1, as the power demand Pdrv* decreases below 0, a regeneration request is output to trigger the regenerative state control. The DC-DC converter 53 is driven and controlled to make the system voltage Vsys of the power lines 51 substantially equal to the capacitor voltage Vcap. In this state, the transistor TR is kept OFF, and the regenerative electric power of the motor MG2 is all charged into the battery 52. When the system voltage Vsys approaches to the capacitor voltage Vcap and the voltage difference decreases to or below the preset threshold value β, the transistor TR is switched ON to start charging the capacitor 54. This control effectively prevents generation of inrush current by an ON operation of the transistor TR to charge the capacitor 54 under the condition of a large voltage difference between the system voltage Vsys and the capacitor voltage Vcap.

Figure 11:
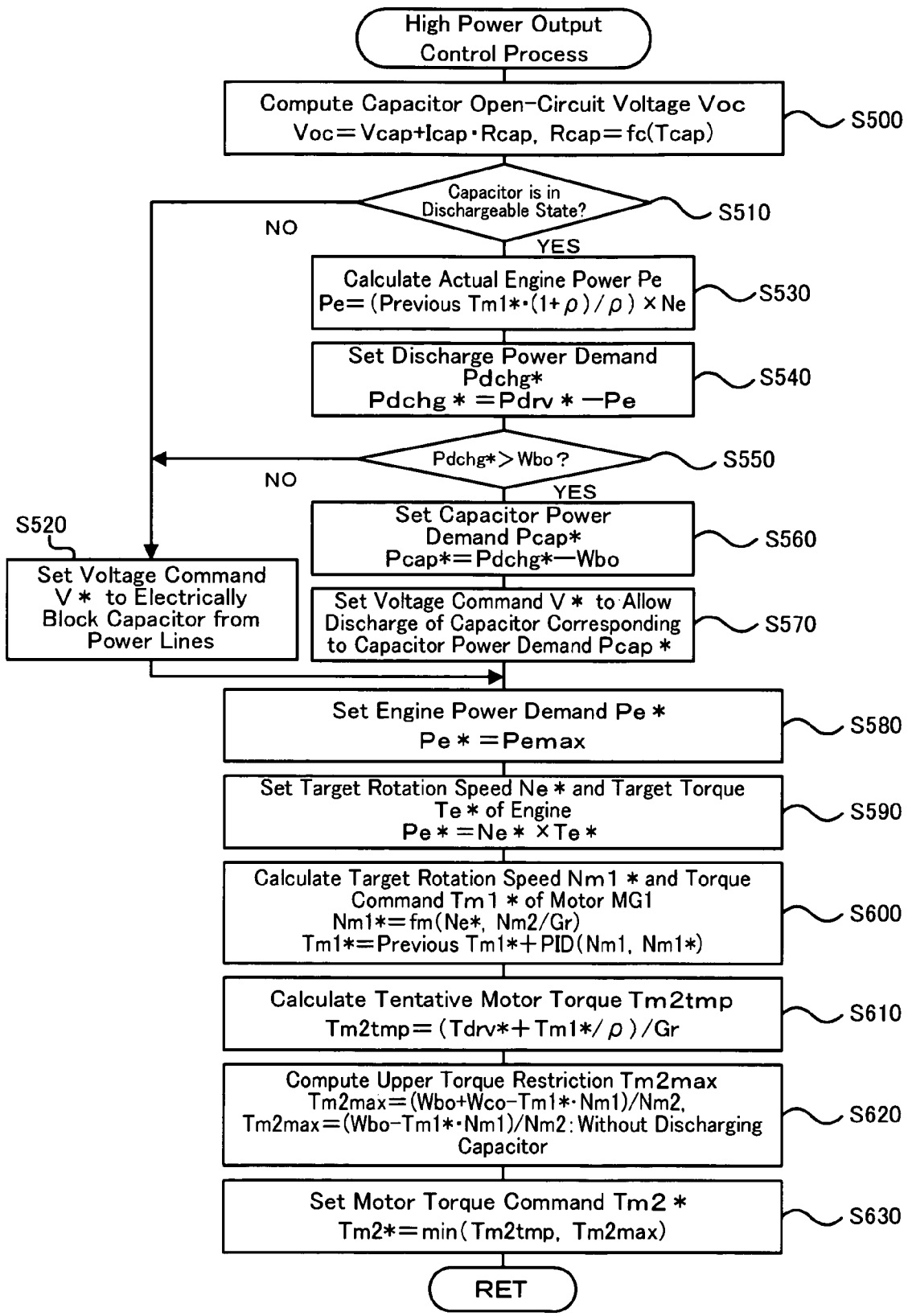
FIG. 11 is a flowchart showing a high power output control process executed at step S160 in the drive control routine of FIG. 3.

In the high power output control process of FIG. 11, the CPU 72 of the hybrid electronic control unit 70 first computes the capacitor open-circuit voltage Voc from the input capacitor voltage Vcap, the input capacitor current Icap, and the input capacitor temperature Tcap according to Equation (1) given above (step S500) and determines whether the capacitor 54 is in a dischargeable state according to the computed capacitor open-circuit voltage Voc (step S510). The determination is based on a result of comparison between the computed capacitor open-circuit voltage Voc and a reference discharge level, which is higher than a lower limit of the working voltage range of the capacitor 54. When the computed capacitor open-circuit voltage Voc decreases to or below the reference discharge level, the CPU 72 determines at step S510 that the capacitor 54 is not in the dischargeable state and sets the voltage command V* to electrically block the capacitor 54 from the power lines 51 (step S520). The diode DI works to allow the flow of electric current from the capacitor 54 to the power lines 51 and prohibit the reverse flow of electric current. Setting the system voltage Vsys to be higher than the capacitor voltage Vcap in the OFF position of the transistor TR electrically blocks the capacitor 54 from the power lines 51. After setting the voltage command V* to electrically block the capacitor 54 from the power lines 51, the CPU 72 sequentially sets a maximum possible power Pemax output from the engine 22 to the engine power demand Pe* (step S580), sets the target rotation speed Ne* and the target torque Te* of the engine 22 (step S590), and sets the target rotation speed Nm1* and the torque command Tm1* of the motor MG1 (step S600). The processing of steps S590 and S600 is identical with the processing of steps S340 and S350 in the ordinary state control process of FIG. 6. The tentative motor torque Tm2tmp to be output from the motor MG2 is calculated from the torque demand Tdrv*, the torque command Tm1* of the motor MG1, the gear ratio ρ of the power distribution integration mechanism 30, and the gear ratio Gr of the reduction gear 35 (step S610). This calculation follows Equation (8), which is obtained by replacing the torque command Tm2* of Equation (4) with the tentative motor torque Tm2tmp:

$$Tm2tmp=(Tdrv^{*}+Tm1^{*}/\rho)/Gr \qquad (8)$$

An upper torque restriction Tm2max is then calculated as a maximum possible torque output from the motor MG2 according to Equation (9) given below (step S620). The calculation subtracts the product of the torque command Tm1* and the current rotation speed Nm1 of the motor MG1 from the battery output limit Wbo and divides the difference by the current rotation speed Nm2 of the motor MG2:

$$Tm2\max=(Wbo-Tm1^{*}\cdot Nm1)/Nm2 \qquad (9)$$

The smaller between the tentative motor torque Tm2tmp and the upper torque restriction Tm2max is set to the torque command Tm2* of the motor MG2 (step S630). The CPU 72 terminates this high power output control process of FIG. 11 and concludes the processing of step S160 in the drive control routine of FIG. 3. The CPU 72 then sends the respective setting values to the relevant ECUs (step S170) and terminates the drive control routine of FIG. 3. In this state, the motor MG2 outputs the torque with discharge of the battery 52 but without discharge of the capacitor 54. The output torque of the motor MG2 is restricted in the range of the battery output limit Wbo.

When the computed capacitor open-circuit voltage Voc is higher than the reference discharge level, the CPU 72 determines at step S510 that the capacitor 54 is in the dischargeable state and calculates an actual engine power Pe as the power actually output from the engine 22 from the previous value of the torque command Tm1* of the motor MG1 and the current rotation speed Ne of the engine 22 according to Equation (10) given below (step S530):

$$Pe=\text{(Previous } Tm1^{*}\cdot(1+\rho)/\rho)\times Ne \qquad (10)$$

The CPU 72 then subtracts the calculated actual engine power Pe from the power demand Pdrv* set at step S110 in the drive control routine of FIG. 3 and sets the difference to a discharge power demand Pdchg* to be discharged from the power supply system 50 (step S540).

The discharge power demand Pdchg* is compared with the battery output limit Wbo (step S550). When the discharge power demand Pdchg* is greater than the battery output limit Wbo, the CPU 72 subtracts the battery output limit Wbo from the discharge power demand Pdchg* and sets the difference to the capacitor power demand Pcap* (step S560). The voltage command V* is set to allow discharge of the capacitor 54 corresponding to the capacitor power demand Pcap* (step S570). When the discharge power demand Pdchg* is not greater than the battery output limit Wbo, on the other hand, the voltage command V* is set to electrically block the capacitor 54 from the power lines 51 and prohibit discharge of the capacitor 54 (step S520). The CPU 72 then executes the processing of and after step S580 described above. In the state of discharging the capacitor 54, the upper torque restriction Tm2max is set according to Equation (11) given below, in place of Equation (9) at step S620:

$$Tm2\max=(Wbo+Wco-Tm1^{*}\cdot Nm1)/Nm2 \qquad (11)$$

The upper torque restriction Tm2max is computed by subtracting the product of the torque command Tm1* and the current rotation speed Nm1 of the motor MG1 from the sum of the battery output limit Wbo and the capacitor output limit Wco and dividing the difference by the current rotation speed Nm2 of the motor MG2. In the state of discharging the capacitor 54, the output torque of the motor MG2 is restricted in the range of the battery output limit Wbo and the capacitor output limit Wco.

Figure 12:
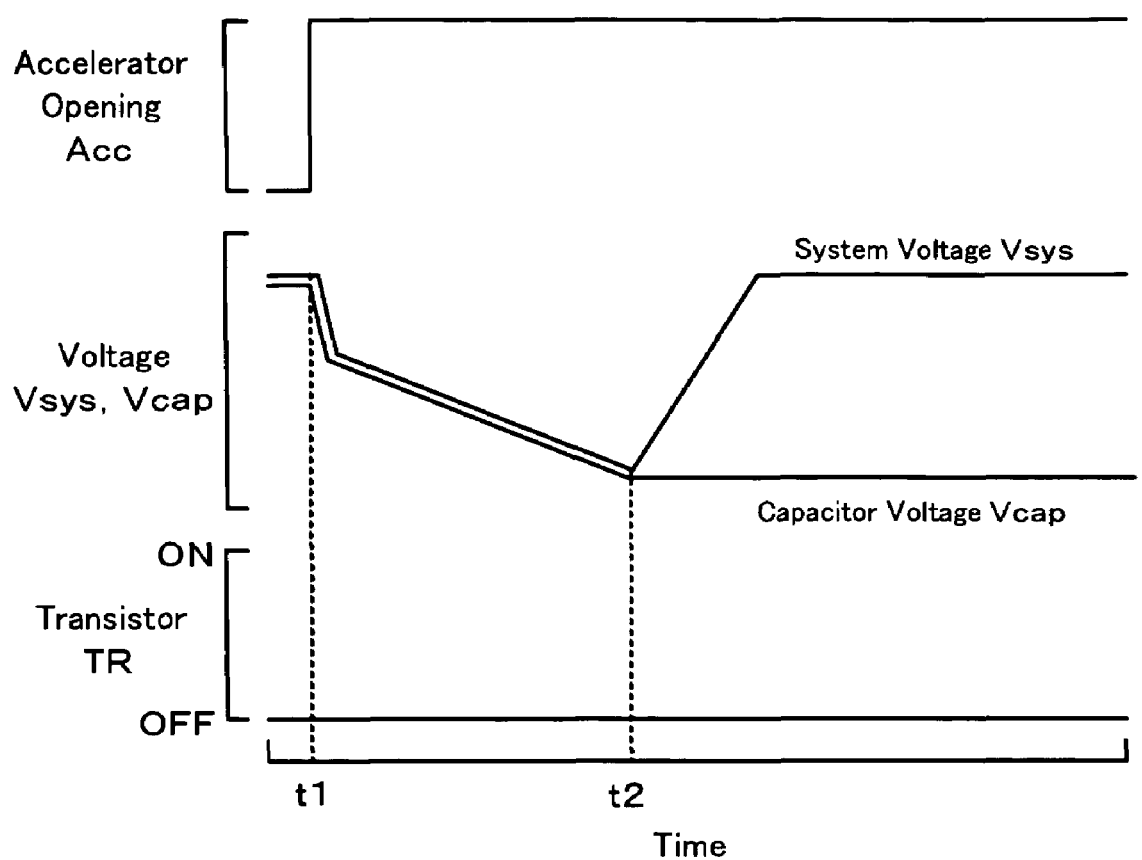
FIG. 12 shows time variations of the system voltage Vsys and the capacitor voltage Vcap and the ON-OFF state of the transistor TR in response to a change of an accelerator opening Acc.

FIG. 12 shows time variations of the system voltage Vsys and the capacitor voltage Vcap and the ON-OFF state of the transistor TR in response to a change of the accelerator opening Acc. When the driver abruptly steps down the accelerator pedal 83 at a time point t1, the drive control flow goes from the ordinary state control of FIG. 6 to the high power output control of FIG. 11. The engine power demand Pe* rapidly increases with a sharp increase of the power demand Pdrv*. The response delay of the engine 22, however, allows only a gradual increase of the actual output power of the engine 22. In this state, the motor MG2 is driven with the discharged power from both the battery 52 and the capacitor 54. The power demand Pdrv* is thus satisfied even when the output level of the engine 22 does not reach the engine power demand Pe*. The discharge of the capacitor 54 lowers the capacitor voltage Vcap to the reference discharge level at a time point t2. The capacitor 54 is then determined to be not in the dischargeable state and is electrically blocked from the power lines 51.

In the hybrid vehicle 20 of the embodiment described above, the power supply system 50 includes the capacitor 54, the transistor TR, and the diode DI. The capacitor 54 is connected to the power lines 51, which are shared by the inverters 41 and 42 and are linked to the battery 52 via the DC-DC converter 53. The transistor TR is located between the power lines 51 and the capacitor 54 and is arranged in the direction of charging the capacitor 54. The diode DI is arranged in the opposite direction in parallel with the transistor TR. Drive control of the transistor TR and the DC-DC converter 53 enables output of the torque demand Tdrv* to the ring gear shaft 32a or the drive shaft, while adequately controlling charge and discharge of the capacitor 54. This control ensures the improved driving performance.

In the hybrid vehicle 20 of the embodiment, as the power demand Pdrv* decreases below 0, a regeneration request is output to make the motor MG2 subject to regenerative control. In this regenerative control, the transistor TR is switched ON to allow charging the capacitor 54 only after the system voltage Vsys sufficiently approaches to the capacitor voltage Vcap. This effectively prevents generation of inrush current in the state of charging the capacitor 54.

In the hybrid vehicle 20 of the embodiment, in the case where the power demand Pdrv* is not lower than the preset reference power level Pref, the discharge power demand Pdchg* computed by subtracting the actual engine power Pe from the power demand Pdrv* is compared with the battery output limit Wbo. When the discharge power demand Pdchg* is not greater than the battery output limit Wbo, only the battery 52 is discharged to compensate for an insufficiency of the output power of the engine 22 and ensure output of the power demand Pdrv* to the ring gear shaft 32a. When the discharge power demand Pdchg* is greater than the battery output limit Wbo, on the other hand, the capacitor 54 is discharged additionally to the discharge of the battery 52. Even when the response delay of the engine 22 does not allow the output level of the engine 22 to immediately follow a sudden increase of the power demand Pdrv*, this combined discharge enables the power demand Pdrv* to be output to the ring gear shaft 32a. The discharge of the capacitor 54 is limited to the case when the discharge of the battery 52 does not fully compensate for the insufficiency of the engine output power. Such limitation desirably ensures satisfaction of the power demand Pdrv* without using the excessively high-performance capacitor 54. When the capacitor 54 is determined to be not in the dischargeable state with a decrease of the capacitor open-circuit voltage Voc, the capacitor 54 is electrically blocked from the power lines 51. The blockage effectively prevents the system voltage Vsys from decreasing below a threshold level of significantly reducing the torque output from the motor MG2 with a decrease of the capacitor voltage Vcap.

Figure 13:
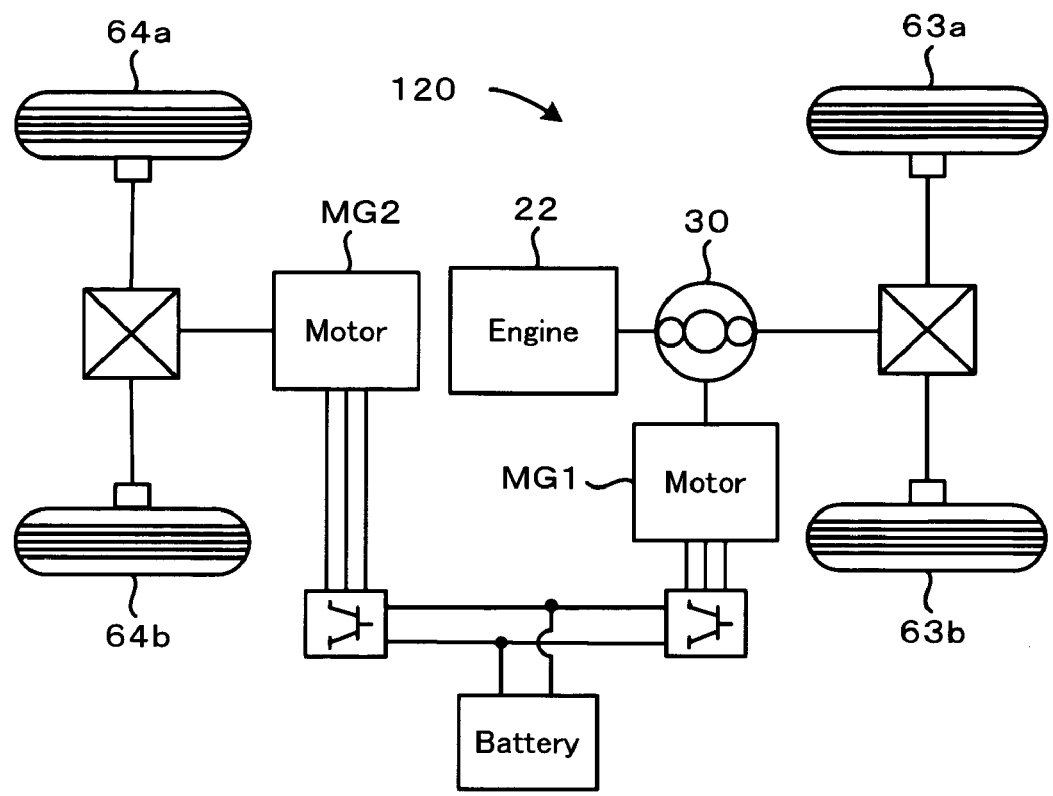
FIG. 13 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 13, the power of the motor MG2 may be output to another axle (that is, an axle linked with wheels 64a and 64b), which is different from an axle connected with the ring gear shaft 32a (that is, an axle linked with the wheels 63a and 63b).

Figure 14:
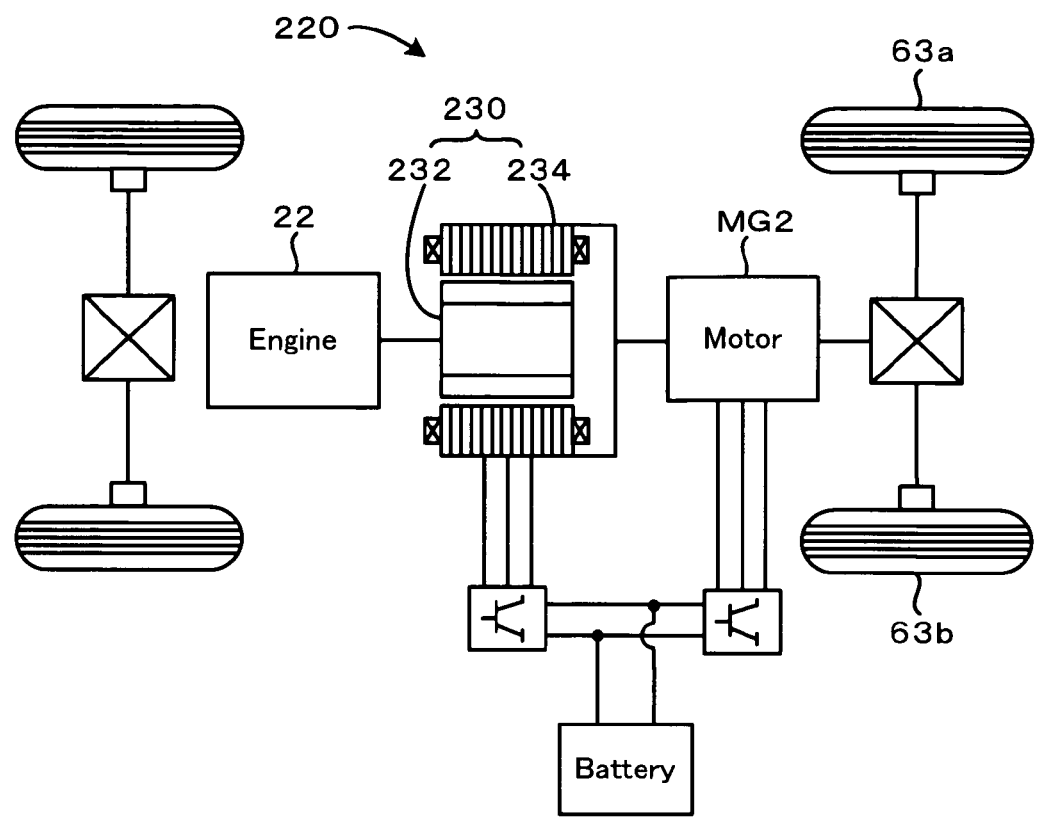
FIG. 14 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 14, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment regards the driving device of the invention mounted on the hybrid vehicle. The technique of the invention is applicable to the driving device of any configuration that uses a motor to drive a drive shaft with charge and discharge of a power supply system. Application of such a driving device is not restricted to the hybrid vehicles. The driving device may be mounted on any other vehicles, for example, electric vehicles without an engine, as well as on moving bodies other than the motor vehicles, for example, railway cars, ships and boats, and aircraft. The technique of the invention is not restricted to driving devices mounted on such moving bodies but is also applicable to driving devices incorporated in stationary equipment, such as construction machines.

The embodiment and its modifications discussed above are to be considered in all aspects as illustrative and not restrictive. There may be many other modifications, changes, and alterations without departing from the scope or spirit of the main characteristics of the present invention.

The disclose of Japanese Patent Application No. 2004-323306 filed Nov. 8, 2004 including specification, drawings and claims is incorporated herein by reference in its entirety.

What is claimed is:

1. A driving device that drives a drive shaft, said driving device comprising:

a motor that has power generation capability and inputs and outputs power from and to the drive shaft;

a driving circuit that drives the motor;

a power supply system including a secondary battery that is linked to the driving circuit via a voltage converter, a capacitor that transmits electric power to and from an electric power line connecting the voltage converter with the driving circuit, and a connection switch that is located between the electric power line and the capacitor;

a drive control module that drives and controls the driving circuit, the voltage converter, and the connection switch to output a power equivalent to a preset power demand to the drive shaft; and a voltage sensor that measures an inter-terminal voltage of the capacitor, wherein in response to a request of motor regenerative control in an off state of the connection switch, said drive control module drives and controls the driving circuit to trigger regenerative control of the motor, while driving and controlling the voltage converter to make a voltage level applied to the electric power line approach to the measured inter-terminal voltage of the capacitor, said drive control module subsequently driving and controlling the connection switch and the voltage converter to turn on the connection switch and to charge the capacitor with electric power regenerated by the motor.

2. A driving device in accordance with claim 1, wherein said drive control module drives and controls the voltage converter to make the voltage level applied to the electric power line substantially equal to the measured inter-terminal voltage of the capacitor.

3. A driving device in accordance with claim 1, wherein the connection switch includes a semiconductor switch arranged in a direction of charging the capacitor and a diode arranged in an opposite direction in parallel to the semiconductor switch.

4. A driving device in accordance with claim 3, wherein said drive control module drives and controls the semiconductor switch and the voltage converter to allow electric power supply from at least one of the secondary battery and the capacitor to the driving circuit, in order to satisfy the power demand.

5. A driving device in accordance with claim 4, wherein when output of a power equivalent to the power demand to the drive shaft is attainable in a range of output restriction of the secondary battery, said drive control module drives and controls the semiconductor switch and the voltage converter to allow electric power supply from the secondary battery to the driving circuit but to prohibit electric power supply from the capacitor to the driving circuit, when the output of the power equivalent to the power demand to the drive shaft is not attainable in the range of output restriction of the secondary battery, said drive control module driving and controlling the voltage converter to allow electric power supply from both the secondary battery and the capacitor to the driving circuit.

6. A driving device in accordance with claim 3, wherein when an inter-terminal voltage of the capacitor is lower than a preset reference level, said drive control module drives and controls the semiconductor switch and the voltage converter to electrically block the capacitor from the electric power line.

7. A driving device in accordance with claim 1, said driving device further comprising:

an internal combustion engine; and a power generation unit that utilizes output power of the internal combustion engine to generate electric power and supplies the generated electric power to the driving circuit.

8. A driving device in accordance with claim 7, wherein the connection switch includes a semiconductor switch arranged in a direction of charging the capacitor and a diode arranged in an opposite direction in parallel to the semiconductor switch, and when the power demand increases to or over a predetermined power level, said drive control module controls operations of the internal combustion engine and the power generation unit to output power, drives and controls the semiconductor switch and the voltage converter to allow electric power supply from at least one of the secondary battery and the capacitor to the driving circuit, based on a difference between an actual output power of the internal combustion engine and the power demand, and drives and controls the driving circuit to output a power equivalent to the power demand to the drive shaft.

9. A driving device in accordance with claim 8, wherein when output of a power equivalent to the power demand to the drive shaft is attainable by a total of the actual output power of the internal combustion engine and a maximum output restriction of the secondary battery, said drive control module drives and controls the semiconductor switch and the voltage converter to allow electric power supply from the secondary battery to the driving circuit but to prohibit electric power supply from the capacitor to the driving circuit, when the output of the power equivalent to the power demand to the drive shaft is not attainable by the total of the actual output power of the internal combustion engine and the maximum output restriction of the secondary battery, said drive control module driving and controlling the semiconductor switch and the voltage converter to allow electric power supply from both the secondary battery and the capacitor to the driving circuit.

10. A driving device in accordance with claim 7, wherein the power generation unit comprises:

a three shaft-type power input output module that is linked to three shafts, an output shaft of the internal combustion engine, the drive shaft, and a third rotating shaft, and inputs and outputs power from and to a residual one shaft, based on powers input from and output to any two shafts among the three shafts; and a generator that is capable of inputting and outputting power from and to the third rotating shaft.

11. A driving device in accordance with claim 7, wherein the power generation unit comprises:

a pair-rotor motor that has a first rotor connected to an output shaft of the internal combustion engine and a second rotor connected to the drive shaft and rotates the first rotor relative to the second rotor through electromagnetic interactions of the first rotor and the second rotor.

12. A motor vehicle, comprising:

a motor that has power generation capability and inputs and outputs power from and to a drive shaft linked to an axle of said motor vehicle;

a driving circuit that drives the motor;

a power supply system including a secondary battery that is linked to the driving circuit via a voltage converter, a capacitor that transmits electric power to and from an electric power line connecting the voltage converter with the driving circuit, and a connection switch that is located between the electric power line and the capacitor;

a drive control module that drives and controls the driving circuit, the voltage converter, and the connection switch to output a power equivalent to a preset power demand to the drive shaft; and a voltage sensor that measures an inter-terminal voltage of the capacitor, wherein in response to a request of motor regenerative control in an off state of the connection switch, said drive control module drives and controls the driving circuit to trigger regenerative control of the motor, while driving and controlling the voltage converter to make a voltage level applied to the electric power line approach to the measured inter-terminal voltage of the capacitor, said drive control module subsequently driving and controlling the connection switch and the voltage converter to turn on the connection switch and to charge the capacitor with electric power regenerated by the motor.

* * * * *